United States Patent Office 3,764,333
Patented Oct. 9, 1973

3,764,333

THERMOGRAPHIC COPY SHEET CONTAINING 2-PHENYL 1,3-INDANEDIONE

Albert W. Leclair, Hudson, and Charles H. Benbrook, Nashua, N.H., assignors to Nashua Corporation, Nashua, N.H.

No Drawing. Continuation of abandoned application Ser. No. 25,259, Apr. 2, 1970. This application May 15, 1972, Ser. No. 253,660
Int. Cl. G03c *1/00*
U.S. Cl. 96—88 1 Claim

ABSTRACT OF THE DISCLOSURE

A thermographic copy sheet capable of being rendered thermographically inactive upon exposure to short wave length radiation is formed from 2-phenyl 1,3-indanedione and a material reactive with it to form a color, such as a silver salt. A dye sensitizer may be included to shift the spectral response.

This application is a continuation of Ser. No. 25,259, filed Apr. 2, 1970, now abandoned.

This invention relates to thermographic copying and provides thermographic copy sheets which may be rendered thermographically insensitive.

In thermographic copying, heat energy, generally from an infra red source, is utilized to bring about a color-forming reaction in the copy sheet. In one type, the heat sensitive sheet is brought into face to face contact with a graphic original which carries an image formed of heat absorbing material. When these are exposed to infra red radiation, the image portion of the original is selectively heated to cause the development in the adjacent sheet of a color pattern corresponding to the original. In another type, one of the color forming components of the copy sheet is destroyed or otherwise rendered inactive by exposure to short wave length radiation in the portions corresponding to the white, non-image areas, thereafter the application of heat or infra red radiation causes color formation in the image areas. This latter type of system has the advantage that the final copy does not remain heat sensitive, as the reactivity of the system has been destroyed by the short wave length radiation. It is primarily to this type of system that the present invention is directed.

The system of this invention may utilize a single sheet having a coating containing reactive components, one of which is rendered inactive by exposure to short wave length radiation. Known systems of this type are described by Lawton and Lopez, U.S. Pat. No. 3,076,707 and by Grant, U.S. Pat. No. 3,094,619, which utilize color-forming systems employing diazonium compounds and alpha naphthols respectively. In these systems the copy sheet may be exposed to a short wave length e.g. ultra violet radiation image of the original to be copied, to inactivate all but the unexposed black areas of the copy sheet, and then heated to develop color in the black areas where the components remain reactive. Alternatively, the copy sheet may be initially exposed to infra red radiation while being in contact with the graphic original, to bring about a color-forming reaction in the areas in contact with the black parts of the original, and then subsequently exposed to short wave length radiation to inactivate the unreacted parts of the sheet.

Two-sheet systems are also known, as exemplified by Benbrook, U.S. Pat. No. 2,789,904 and Workman, U.S. Pat. No. 3,094,417, in which the reactant susceptible of being deactivated by exposure to short wave length radiation is carried on a sheet separate from the sheet which carries the material with which it enters into a color forming reaction. In utilizing the two-sheet system, the sheet containing the deactivatable component is first exposed to a short wave radiation image of the original to be copied to cause deactivation of the exposed portions. This sheet is then brought into contact with a sheet containing the other color forming components and heated to bring about a color forming reaction in the unexposed areas. The two-sheet system requires that one of the color forming reactants will transfer when heated from one sheet to the other sufficiently to bring about the color forming reaction.

The present invention is based on the discovery that 2-phenyl 1,3-indanedione is useful in a number of color-forming reactions and may be rendered inactive by exposure to short wave length radiation. This invention accordingly provides systems in addition to those previously known for providing permanent heat insensitive copies by thermographic means.

In general, the system of this invention utilizes 2-phenyl 1,3-indanedione and a compound with which it enters into a color forming reaction. The compound may be for instance a silver salt which is reducible by or a metal which reacts with 2-phenyl-1,3-indanedione to form a colored complex. Furthermore, the compound with which 2-phenyl 1,3-indanedione enters into a color-forming reaction can be a co-crystal adduct of a bisphenol and an amine as for example, disclosed in U.S. Pats. 3,185,583 to Baumann et al., and 3,076,707 to Lawton et al. The indanedione and color forming compound may be combined in a suitable binder and applied to a backing sheet of paper or the like in a single coating, they may be applied in separate coatings in face to face contact on a single backing sheet, or they may be applied as separate coatings on separate sheets. The binder may be omitted from either or both coatings and the reactants supplied from a solution in a suitable solvent.

The indandione is desensitized by exposure to ultra violet radiation, but also may be rendered sensitive to actinic radiation of longer wave length, for instance that from a tungsten filament lamp, by introducing a dye sensitizer in accordance with well known photochemical technology. Dye sensitizers of the erythrosin family have been found to be quite suitable, but others may be used. The indandione also can be employed in admixture with toners and/or secondary reducing agents. The secondary reducing agent is employed in concentrations such that it alone will not effect the color forming reaction. Typical examples of thermographic copy system of this invention are described in the following examples.

EXAMPLE I

A preferred short wave length sensitive sheet useful for instance with the "white" sheet of the commercial so called Dual Spectrum paper sold by Minnesota Mining and Manufacturing Company consists of a thin, e.g. glassine, paper base coated with a methyl ethyl ketone solution of the 1,3-indanedione, to a coated weight of 1.0 lbs. per 3,000 square feet. A suitable coating composition consists of

| | Grams |
|---|---|
| Methyl ethyl ketone | 45.00 |
| 2-phenyl-1, 3-indanedione | 0.15 |
| Ethyl cellulose (Ethocel N–10) | 5.00 |

applied by a Mayer Rod and coated and dried.

Exposure of the sheet of ultra violet radiation e.g. from an 8 watt "black light bulb (GE F8T5/B1)" for 20 seconds results in inactivation in the exposed "non-image" areas. When the sheet is then placed in contact with a 3M Dual Spectrum white sheet ( described in U.S. Pat. No. 3,094,417) and heated, an image is formed on the white sheet.

EXAMPLE II

A thermosensitive sheet capable of desensitization following activation may be formed by applying the 1,3-indanedione coating composition described in Example I to a 3M Dual Spectrum white sheet and drying this sheet may then be used for thermographic recordings, following which exposure to ultra violet radiation results in desensitization of the white inactivated areas.

EXAMPLE III

A sheet sensitive to tungsten radiation may be formed by adding a dye sensitizer to the indanedione. A coating composition of this type may consist of

| | Grams |
|---|---|
| Methyl ethyl ketone | 45.00 |
| Ethyl cellulose (Ethocel N–10) | 5.00 |
| Erythrosin | 0.01 |
| 2-phenyl-1, 3-indanedione | 0.15 |

A sheet of paper coated as in Example III may be used in place of the 3M Dual Spectrum pink sheet in the Dual Spectrum machine and then placed in contact with a 3M Duel Spectrum white sheet and heated in the usual manner. It will become deactivated by exposure to light of wave length of about 4,000 to 7,000 angstroms.

It is to be understood that the 2-phenyl 1,3-indanedione employed in this invention can exist in both the keto and enol forms and that this invention includes the use of both forms of this compound.

Dye sensitizers other than erythrosin (2′,4′,5′,7′-tetraiodofluorescein) that may be used include Rose Bengal, Cafranin-O, Methylene blue, Eosin Y, and Seto flavine T, all of which are well known as being effective to shift the spectral response of a photosensitive material into the visual range.

We claim:

1. A copy sheet useful in a copy system wherein a color forming reaction occurs between an indanedione compound susceptible to inactivation upon exposure to ultraviolet radiation and an organic salt of silver, reactive with an compound to produce a contrasting color, said copy sheet comprising a base sheet, and a coating thereon consisting essentially of a binder, 2-phenyl 1,3-indanedione and an optical dye sensitizer.

References Cited

UNITED STATES PATENTS

| | | | |
|---|---|---|---|
| 3,149,991 | 9/1964 | Baumann et al. | 117—36.8 |
| 3,028,254 | 4/1962 | Grant | 117—36.8 |

NORMAN G. TORCHIN, Primary Examiner

W. H. LOUIE, Jr., Assistant Examiner

U.S. Cl. X.R.

96—48 HD, 67; 117—36.2, 36.8, 36.9